(12) United States Patent
Zhang et al.

(10) Patent No.: US 7,496,802 B2
(45) Date of Patent: Feb. 24, 2009

(54) SYSTEM AND METHOD FOR DISPLAYING MOTHERBOARD ALARMS

(75) Inventors: Jing-Chao Zhang, Guangdong (CN); Hua Dong, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 273 days.

(21) Appl. No.: 11/309,341

(22) Filed: Jul. 28, 2006

(65) Prior Publication Data
US 2007/0088882 A1   Apr. 19, 2007

(30) Foreign Application Priority Data
Aug. 5, 2005   (CN) .................... 2005 1 0036438

(51) Int. Cl.
*G06F 11/00* (2006.01)
(52) U.S. Cl. ...................................................... 714/57
(58) Field of Classification Search .................. 714/57, 714/44–50, 39, 21
See application file for complete search history.

(56) References Cited

U.S. PATENT DOCUMENTS

| 6,209,089 | B1* | 3/2001 | Selitrennikoff et al. ......... 713/2 |
| 6,542,997 | B1 | 4/2003 | Rolls et al. |
| 7,200,746 | B2* | 4/2007 | Yang et al. ..................... 713/2 |
| 2003/0237032 | A1* | 12/2003 | Adler et al. ................. 714/718 |
| 2005/0246589 | A1* | 11/2005 | Tsai et al. ..................... 714/38 |

FOREIGN PATENT DOCUMENTS

| CN | 2372720 | 4/2000 |
| CN | 1591351 A | 3/2005 |
| TW | M240622 | 8/2004 |

* cited by examiner

*Primary Examiner*—Nadeem Iqbal
(74) *Attorney, Agent, or Firm*—Winston Hsu

(57) ABSTRACT

An exemplary method for displaying motherboard alarms includes the steps of: reading status information of the motherboard; classifying the status information, each kind of information corresponding to an alarm category, and each alarm category corresponding to an alarm sound; reading a configuration file; determining whether the parameters of the motherboard comply with parameter ranges set in the configuration file; determining an alarm category and setting a corresponding alarm sound, and displaying alarm interfaces if any parameter of the motherboard does not comply with the parameter ranges set in the configuration file.

11 Claims, 3 Drawing Sheets

SYSTEM AND METHOD FOR DISPLAYING MOTHERBOARD ALARMS

DESCRIPTION

1. Field of the Invention

The present invention is generally related to systems and methods for displaying motherboard information, and particularly to a system and method for displaying motherboard alarms informatively.

2. Description of Related Art

With the continuing advances and developments of electrical manufactures, new generation computers with better performance, stability, and reliability has been the focus of consumers. The amount of resources poured into the enhancement of computers has directly and indirectly affected the population and vigorous development of related industries. It is well known that the system performance of a computer mainly depends on the motherboard and devices fabricated thereon, such as a central processing unit (CPU), a random access memory (RAM), chip sets, etc. In regards to the various devices with more complicated structures therein, the technology to effectively integrate these devices for further enhancing system performance has become an important issue. Actually, when a computer system is operated, the devices of the motherboard usually have different loadings, and the CPU will involve in a busy state.

To enhance the reliability and consistency of these various devices, a quality of the various devices can be enhanced. Related parameters of the devices can be monitored in real time so as to ensure enhanced system performance. If the parameters of the devices have any abnormities, the motherboard can prompt a user to tackle the abnormities, allowing the natural life of the motherboard or the devices to be prolonged. Manufacturers may also use computer chips or software to monitor the motherboard and obtain information of the devices. The information includes fan speed, CPU temperature, and CPU voltage, all of which are displayed in quantitative data to the user. The quantitative data may be very peculiar that an average user cannot understand it, for example, if the motherboard sounds an alarm, the average user may not know which device has the abnormity.

Therefore, what is needed is a system and method for displaying motherboard alarms informatively.

SUMMARY OF INVENTION

A system for displaying motherboard alarms is provided in accordance with a preferred embodiment. The system typically includes an information reading module, an information classifying module, a configuration file saving module, an alarming module and an information displaying module. The information reading module is configured for reading status information of a motherboard. The information classifying module is configured for classifying the status information. The configuration file saving module is configured for creating a configuration file, and the configuration file is configured for setting working condition parameters of couplings of the motherboard. The alarming module is configured for alarming, determining an alarm category according to the kind of status information, and setting a corresponding alarm sound. The information displaying module is configured for displaying a motherboard interface and a monitor area interface, and highlighting alarm interfaces.

A method for displaying motherboard alarms is provided. The method includes the steps of: reading status information of a motherboard; classifying the status information, each kind of status information corresponds to an alarm category, and each alarm category corresponds to an alarm sound; reading a configuration file that is used for setting working condition parameters of couplings of the motherboard; determining whether the status information of the motherboard comply with working condition parameters set in the configuration file; and determining an alarm category and setting a corresponding alarm sound, displaying alarm interfaces if any status information of the motherboard does not comply with the working condition parameters set in the configuration file.

Another system for displaying motherboard alarms is provided. The system typically includes an information reading module, an information classifying module, a configuration file saving module and an alarming module. The information reading module is configured for reading status information of a motherboard. The information classifying module is configured for classifying the status information. The configuration file saving module is configured for creating a configuration file, and the configuration file is configured for setting working condition parameters of couplings of the motherboard. The alarming module is configured for alarming, determining an alarm category according to the kind of status information, and setting a corresponding alarm sound.

Other systems, methods, features, and advantages of the present invention will be or become apparent to one with skill in the art upon examination of the following drawings and detailed description.

DETAILED DESCRIPTION

Figure 1:
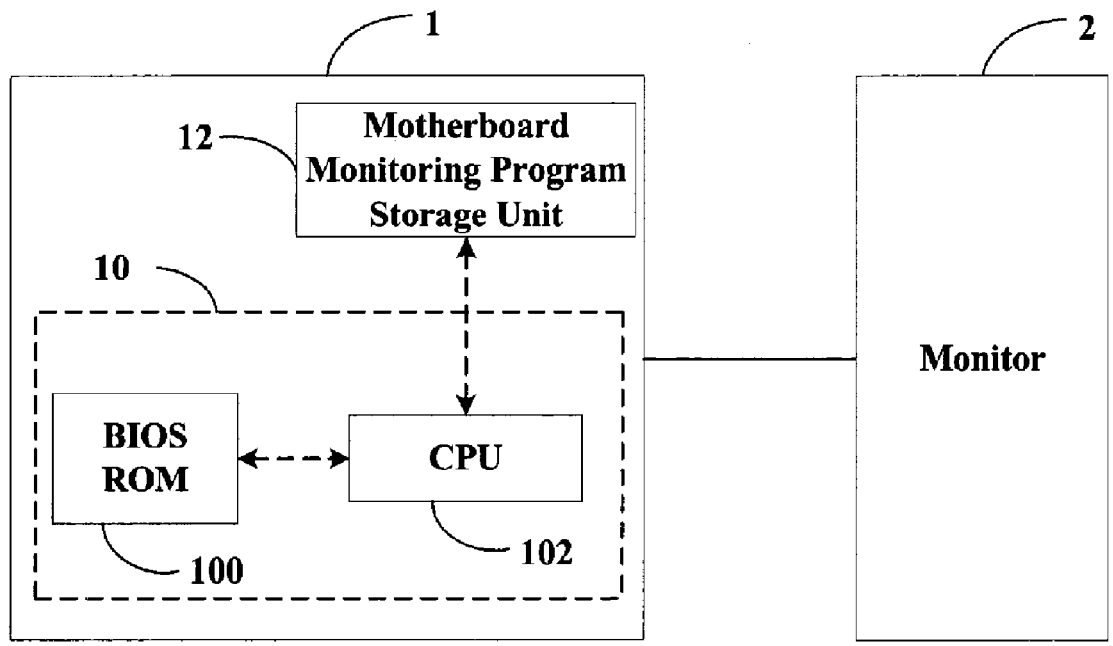
FIG. 1 is a schematic diagram of a hardware configuration of a system for displaying motherboard alarms, in accordance with one embodiment.

FIG. 1 is a schematic diagram of a hardware configuration of a system for displaying motherboard alarms informatively (hereinafter, "the system") in accordance with one preferred embodiment. The system typically includes a host computer 1 and a monitor 2 connected thereto. The host computer 1 typically includes a motherboard 10 and a motherboard monitoring program storage unit 12 connected therewith. The motherboard 10 includes a basic input output system read-only memory (BIOS ROM) 100 and a central processing unit (CPU) 102. The BIOS ROM 100 is connected with the CPU 102, and is configured for providing status information of the motherboard 10. The motherboard monitoring program storage unit 12 includes a driver program (not shown). The driver program is configured for reading the status information of the motherboard 10 from the BIOS ROM 100 via the CPU 102. The monitor 2 is configured for providing interfaces of the system.

Figure 2:
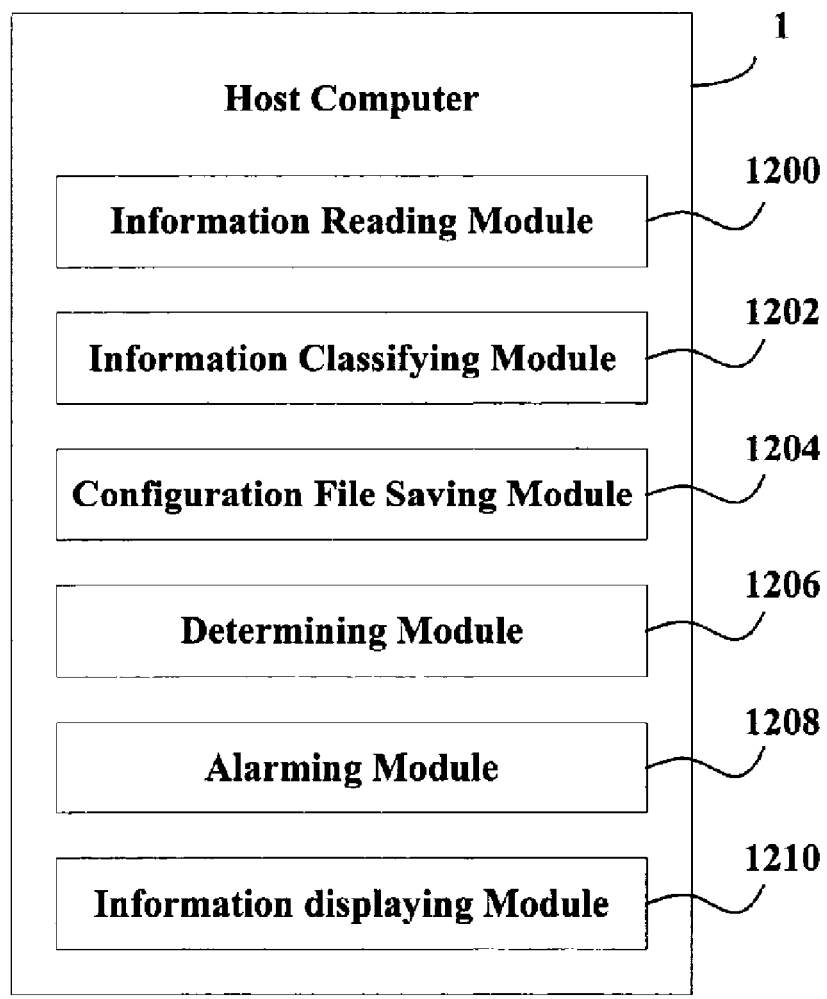
FIG. 2 is a schematic diagram of software function modules of a host computer of FIG. 1.

FIG. 2 is a schematic diagram of software function modules of the host computer 1. The host computer 1 mainly includes an information reading module 1200, an information classifying module 1202, a configuration file saving module 1204, a determining module 1206, an alarming module 1208 and an information displaying module 1210.

The information reading module 1200 is configured for reading status information of the motherboard 10 by utilizing the driver program. The status information of the motherboard 10 mainly includes information regarding fan speed, temperature, and voltage. The information classifying module 1202 is configured for classifying the status information according to couplings of the motherboard 10. Each kind of status information corresponds to an alarm category, and each alarm category corresponds to an alarm sound.

The configuration file saving module 1204 creates a configuration file according to the couplings of the motherboard 10. The configuration file can be configured for determining a type of the motherboard 10. The configuration file is further configured for setting working condition parameters of the couplings of the motherboard 10. The working condition parameters comply with the standard working condition parameters in the art. The working condition parameters include fan speeds, temperatures, voltages, and time intervals to monitor the motherboard 10.

The determining module 1206 is configured for determining whether the status information of the motherboard 10 comply with corresponding working condition parameters set in the configuration file. The determining module 1206 is further configured for determining whether the status information of the motherboard 10 is displayed by the information displaying module 1210, and determining whether monitoring the motherboard 10 has finished.

The alarming module 1208 is configured for alarming if any status information of the motherboard 10 does not comply with the corresponding working condition parameters set in the configuration file. If there the status information of the motherboard 10 that does not comply with the corresponding working condition parameters, this means that the motherboard 10 has an abnormity. The alarming module 1208 determines the alarm category when there is an abnormity with any couplings of the motherboard 10, and further sets a corresponding alarm sound for the coupling. For example, if there is an abnormity with the CPU 102, the alarming module 1208 determines the alarm category as a CPU category.

The information displaying module 1210 is configured for providing the motherboard 10 interfaces, the monitor areas interfaces, and the alarm interfaces. The motherboard 10 interfaces are configured for displaying the couplings of the motherboard 10. The monitor area interfaces are used for displaying parts or optional parts that cannot be directly seated on the motherboard 10 (for example, CD ROM and floppy). The alarm interfaces are interfaces for displaying the motherboard 10 and highlighting the monitor areas that sounds the alarm.

Figure 3:
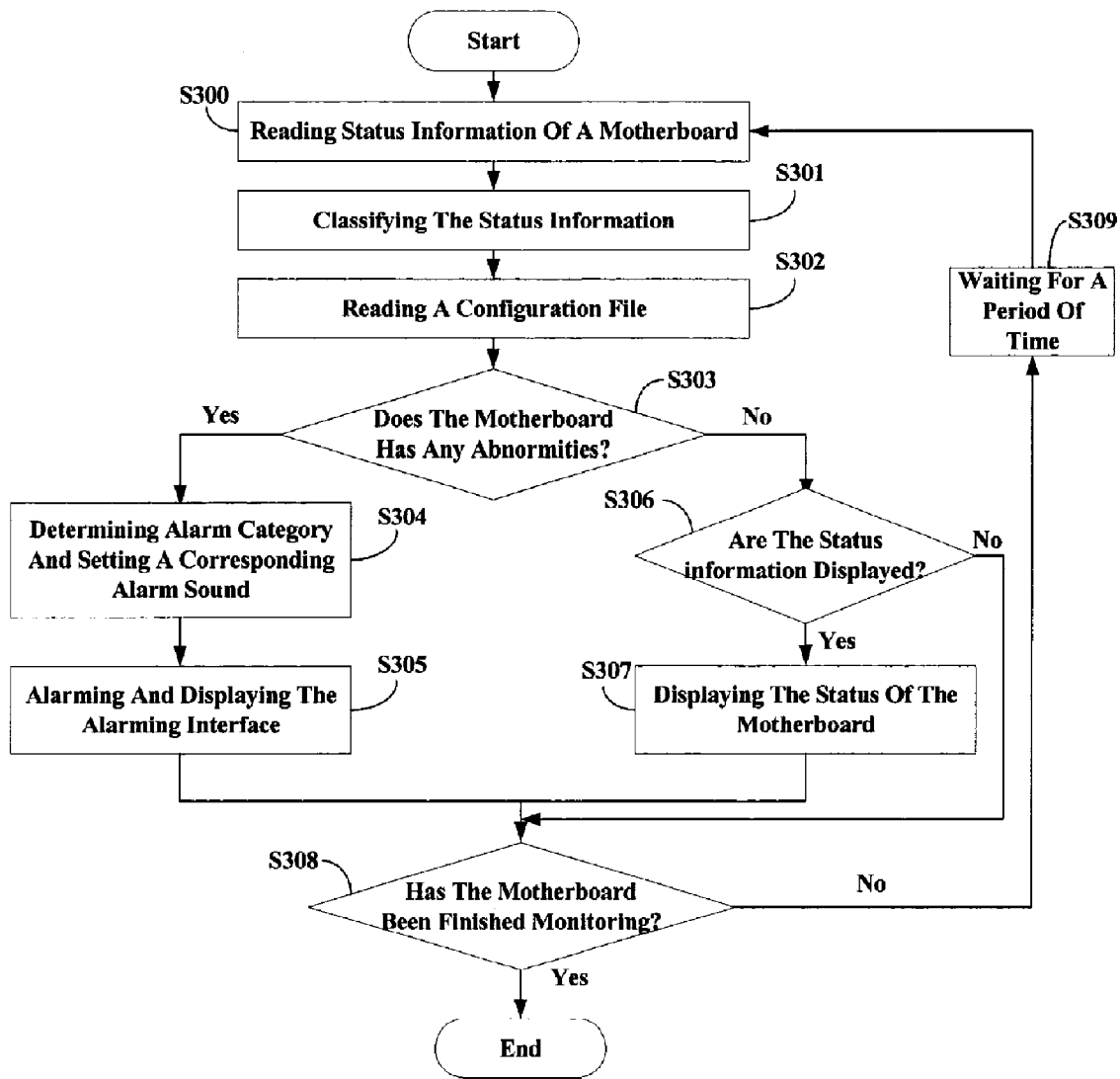
FIG. 3 is a flowchart of a preferred method for displaying motherboard alarms.

FIG. 3 is a flowchart of a preferred method for displaying motherboard alarms informatively, in accordance with one preferred embodiment. In step S300, the information reading module 1200 reads the status information of the motherboard 10 from the BIOS ROM 100 by utilizing the driver program. The status information of the motherboard 10 includes the CPU 102 temperature, the CPU 102 fan speed, and the CPU 102 voltage. The driver program is configured in the motherboard monitoring program storage unit 12.

In step S301, the information classifying module 1202 classifies the status information according to the couplings of the motherboard 10. Each kind of status information corresponds to the alarm category, and each alarm category corresponds to the alarm sound.

In step S302, the configuration file saving module 1204 determines the type of the motherboard 10 according to the status information, sets working condition parameters for the couplings of the motherboard 10, stores and reads the working condition parameters that comply with the standard range in the art. The working condition parameters include fan speed, temperatures, voltages, and time intervals when the motherboard 10 is being monitored.

In step S303, the determining module 1206 determines whether the motherboard 10 has any abnormities. In particular, the determining module 1206 determines whether the status information of the motherboard 10 comply with the working condition parameters set in the configuration file. In step S304, the alarming module 1208 determines the alarm category and sets the corresponding alarm sound reflecting any running parameters of the motherboard 10 that does not comply with the configuration file.

In step S305, the alarming module 1208 sound the alarms and the information displaying module 1210 highlights the alarm interfaces (for example, using different colors, graphics or information reminder), and the corresponding couplings of the motherboard 10 that have abnormities may twinkle.

In step S306, the determining module 1206 determines whether the status information of the motherboard 10 is displayed according to the user's requirement if the parameters of the motherboard 10 comply with the configuration file. For example, if the user moves a cursor over the CPU 102 in the motherboard 10 interfaces, the information displaying module 1210 displays the status information of the CPU 102. The status information of the CPU 102 include a type of the CPU 102, a fan speed of the CPU 102, a temperature of the CPU 102, and a voltage of the CPU 102.

In step S307, the information displaying module 1210 displays the status information of each coupling of the motherboard 10 if the status information of the motherboard 10 need to be displayed.

In step S308, the determining module 1206 determines whether monitoring the motherboard 10 has finished if the user do not want to examine the motherboard 10 interfaces or the information displaying module 1210 has displayed the motherboard 10 interfaces and the alarm interfaces. The alarm interfaces are configured for displaying the motherboard 10 and highlighting the monitor areas that sounds the alarm. The information displaying module 1210 displays alarming information on the corresponding alarm interfaces, that is, the coupling of the motherboard 10 with errors may twinkle and the information displaying module 1210 may displays the status information of the coupling on the corresponding alarm interfaces. The status information includes temperature, voltage, frequency and fan speed.

In step S309, the motherboard 10 can be monitored after a fixed time period, and the process returns the step S310 if the user wants to continue monitoring the motherboard 10. The process can end if the user has finished monitoring the motherboard 10. The fixed time period can be set in the configuration file, the fixed time period is a time interval for the motherboard 10 to be monitored.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for displaying motherboard alarms, the system comprising:

an information reading module configured for reading status information of a motherboard;

an information classifying module configured for classifying the status information, wherein each kind of status information corresponds to an alarm category, and each alarm category corresponds to an alarm sound;

a configuration file saving module configured for creating a configuration file, the configuration file being configured for setting working condition parameters of couplings of the motherboard;

an alarming module configured for alarming, determining the alarm category according to the kind of status information, and setting a corresponding alarm sound; and an information displaying module configured for displaying a motherboard interface and a monitor area interface, highlighting alarm interfaces using different colors, graphics or information reminders, and twinkling the corresponding couplings of the motherboard that have abnormities.

2. The system according to claim 1, further comprising a determining module configured for determining whether the status information of the motherboard needs to be displayed, and for determining whether the motherboard has being monitored.

3. The system according to claim 1, wherein the status information of the motherboard comprises temperature, voltage and fan speed of the motherboard.

4. The system according to claim 1, wherein the information classifying module classifies the status information of the motherboard according to the couplings of the motherboard.

5. The system according to claim 1, wherein the monitor area interface is an interface for displaying required parts or optional parts that cannot be seated on the motherboard directly.

6. A method for displaying motherboard alarms, the method comprising the steps of:

reading status information of a motherboard;

classifying the status information, wherein each kind of status information corresponds to an alarm category, and each alarm category corresponds to an alarm sound;

reading a configuration file that is used for setting working condition parameters of couplings of the motherboard;

determining whether the status information of the motherboard comply with working condition parameters set in the configuration file;

determining an alarm category and setting a corresponding alarm sound if any status information of the motherboard does not comply with the working condition parameters set in the configuration file; and displaying and highlighting alarm interfaces using different colors, graphics or information reminders, and twinkling a corresponding coupling of the motherboard that has abnormities.

7. The method according to claim 6, further comprising:

determining whether the motherboard has being monitored;

waiting for a fixed time period; and returning to the step of reading status information of the motherboard.

8. The method according to claim 7, wherein the fixed time period is a time interval to start monitoring the motherboard.

9. The method according to claim 6, further comprising:

displaying an interface of the motherboard if the status information of the motherboard complies with the working condition parameters set in the configuration file.

10. The method according to claim 6, wherein the configuration file is used for setting working condition parameters of the couplings of the motherboard.

11. A system for motherboard alarms, the system comprising:

an information reading module configured for reading status information of a motherboard;

an information classifying module configured for classifying the status information, wherein each kind of status information corresponds to an alarm category, and each alarm category corresponds to an alarm sound;

a configuration file saving module configured for creating a configuration file, the configuration file being configured for setting working condition parameters of couplings of the motherboard;

an alarming module configured for alarming, determining an alarm category according to the kind of status information, and setting a corresponding alarm sound; and an information displaying module configured for displaying and highlighting alarm interfaces using different colors, graphics or information reminders, and twinkling the corresponding couplings of the motherboard that have abnormities.

* * * * *